(12) United States Patent
Caillon

(10) Patent No.: US 7,356,162 B2
(45) Date of Patent: Apr. 8, 2008

(54) METHOD FOR SORTING POSTAL ITEMS IN A PLURALITY OF SORTING PASSES

(75) Inventor: Christophe Caillon, Bretigny (FR)

(73) Assignee: Solystic, Gentilly (FR)

( * ) Notice: Subject to any disclaimer, the term of this patent is extended or adjusted under 35 U.S.C. 154(b) by 559 days.

(21) Appl. No.: 10/529,795

(22) PCT Filed: Dec. 30, 2004

(86) PCT No.: PCT/FR2004/005064

§ 371 (c)(1),
(2), (4) Date: Mar. 30, 2005

(87) PCT Pub. No.: WO2005/089966

PCT Pub. Date: Sep. 29, 2005

(65) Prior Publication Data

US 2006/0253406 A1    Nov. 9, 2006

(30) Foreign Application Priority Data

Feb. 18, 2004   (FR) .................................. 04 50292

(51) Int. Cl.
*G06K 9/00* (2006.01)
(52) U.S. Cl. ...................... 382/101; 705/410; 382/282; 382/299
(58) Field of Classification Search ................ 382/101, 382/282, 299; 705/410, 406
See application file for complete search history.

(56) References Cited

U.S. PATENT DOCUMENTS

| | | | |
|---|---|---|---|
| 7,065,229 B2 * | 6/2006 | Caillon et al. | 382/101 |
| 2003/0048925 A1 * | 3/2003 | Caillon et al. | 382/101 |
| 2005/0123170 A1 * | 6/2005 | Desprez et al. | 382/101 |
| 2006/0253406 A1 * | 11/2006 | Caillon | 705/410 |

FOREIGN PATENT DOCUMENTS

| | | |
|---|---|---|
| DE | 40 00 603 A | 7/1991 |
| EP | 1 222 037 B | 7/2002 |
| FR | 2 841 673 A | 1/2004 |

* cited by examiner

*Primary Examiner*—Samir Ahmed
*Assistant Examiner*—Nancy Bitar
(74) *Attorney, Agent, or Firm*—Sughrue Mion, PLLC

(57) ABSTRACT

The method of sorting postal items in a plurality of sorting passes using at least one sorting machine having sorting outlets constituted by bins consists in using digital fingerprints (V_ID) identifying the items in a data processor system for automatic address recognition by OCR and/or by video coding. During the first sorting pass, the digital fingerprints of the items are recorded in association with the identification numbers (Bin_ID) of the bins. During the second sorting pass, these digital fingerprints and bin identification numbers are recovered in order to constitute a database (DB) which is updated by counting (46, 47, 48) the fingerprint matches obtained for each loaded bin and by counting consecutive accesses to the database that occur without obtaining a fingerprint match.

12 Claims, 6 Drawing Sheets

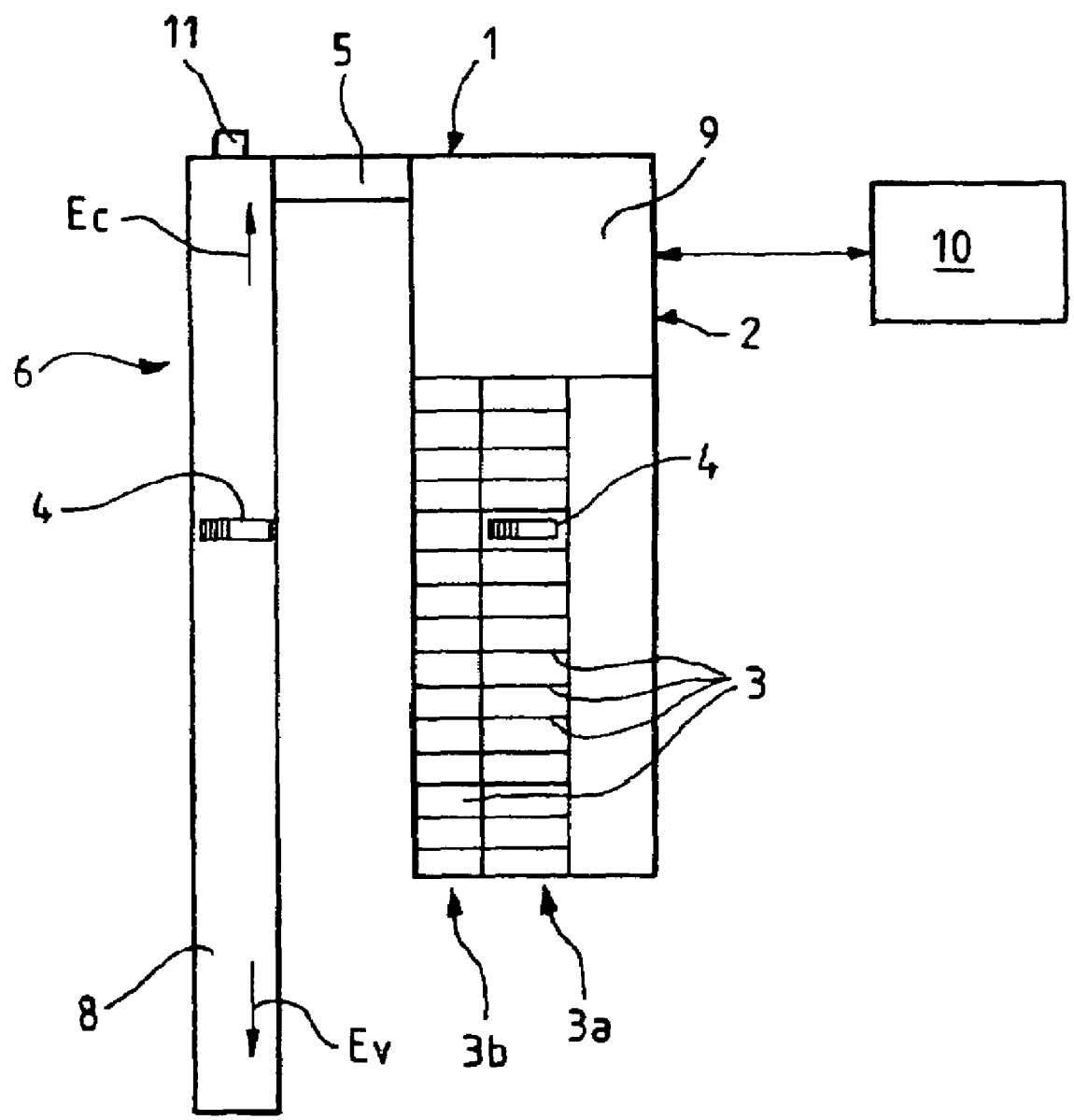

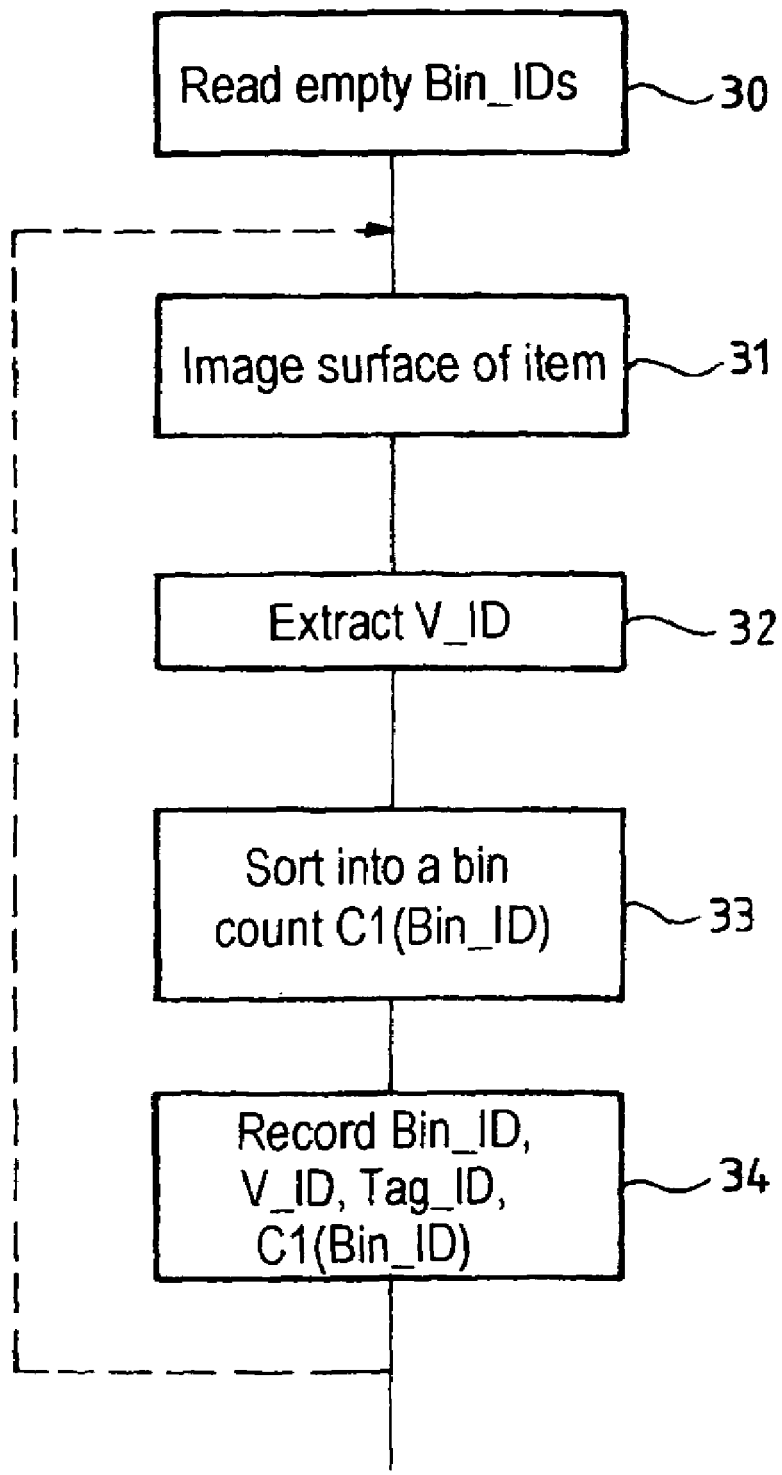

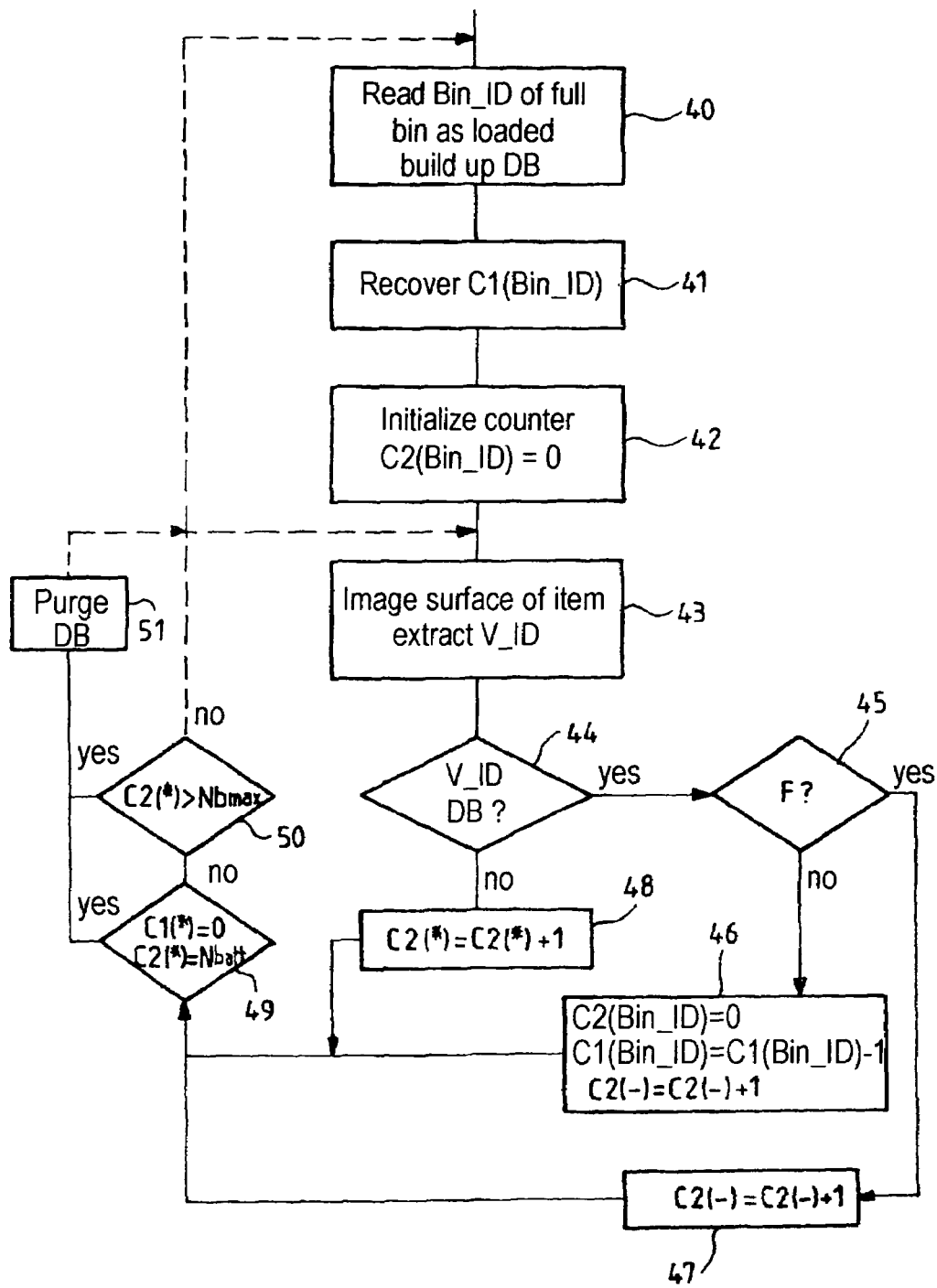

FIG_4
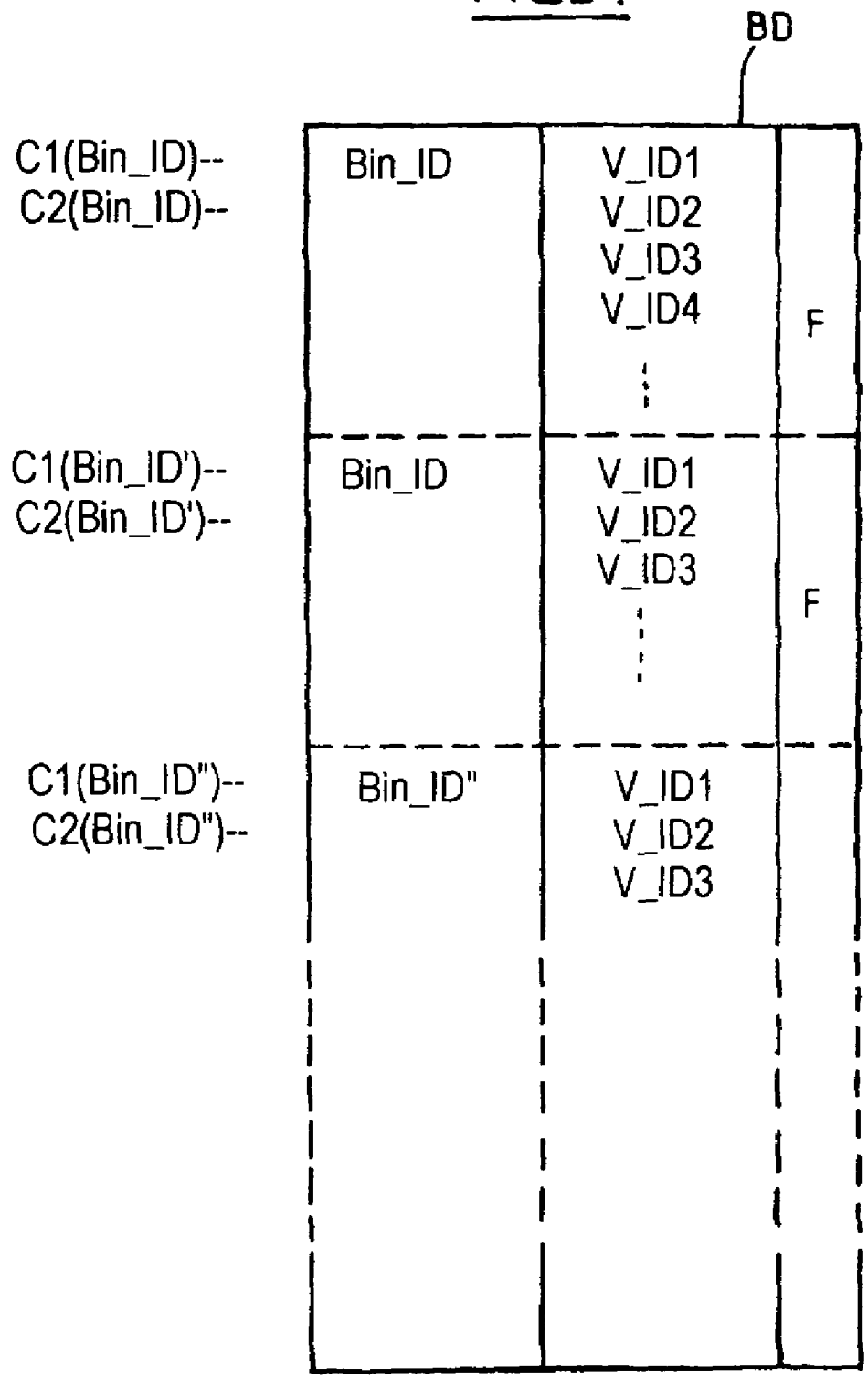

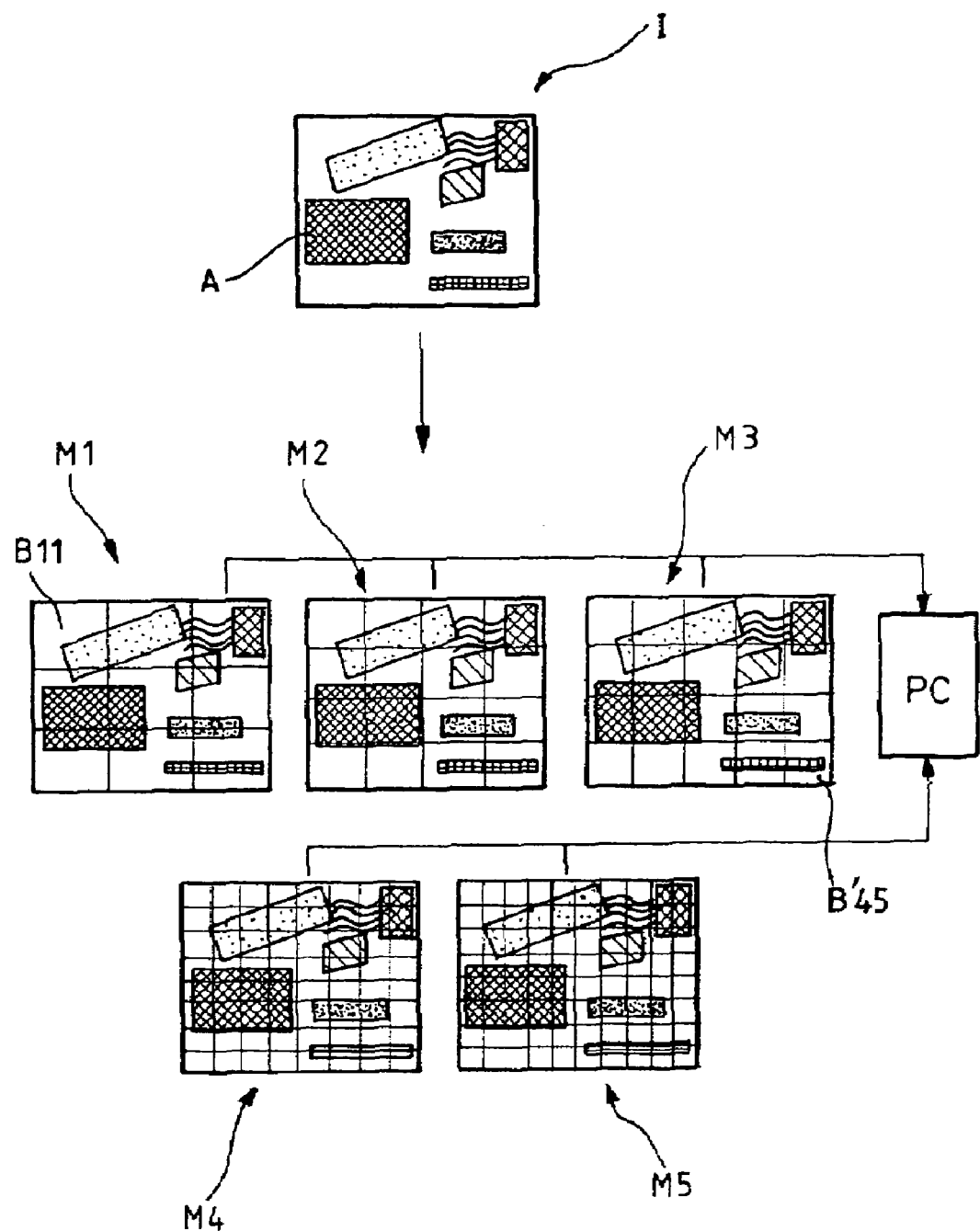
FIG_5

FIG_6
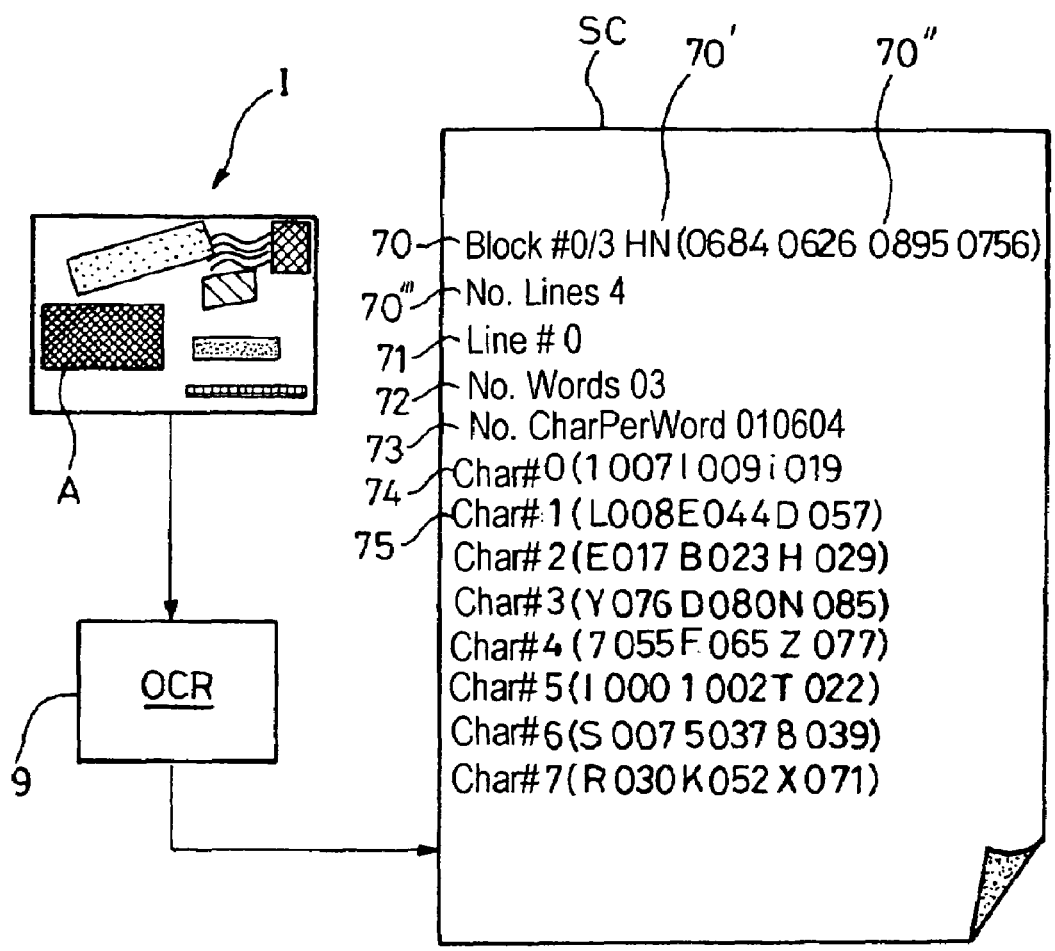

METHOD FOR SORTING POSTAL ITEMS IN A PLURALITY OF SORTING PASSES

The invention relates to a method of sorting postal items in a plurality of sorting passes using at least one sorting machine having sort outlets constituted by bins, each postal item having a surface carrying a destination address that is suitable for being recognized in the sorting machine by a data processor system for automatic recognition of addresses by optical character recognition (OCR) and/or by video coding.

The method of the invention is more particularly adapted to sorting large format items (also referred to as "flat" items) on which it is expensive to appose an identification mark, but the method of the invention can extend to other types of postal item, such as letters and packets, for example.

European patent document EP 1 222 037 discloses a method of sorting postal items in a plurality of sorting passes in which an image of the surface of each postal item is built up as the postal items pass through the sorting machine, which image includes the destination address information, and a digital signature or fingerprint is derived from said image and serves to identify the postal item in the system for automatically recognizing destination addresses by OCR or by video coding. The use of such a digital fingerprint makes it possible to avoid marking postal items using bar code type marking, also known as "ID-tagging". To constitute the discriminating characteristics of the digital fingerprint, that document suggests using the geometrical dimensions of the item as extracted from the image, the distribution of gray values in the image, the position of the item address block in the image, and the characteristics of the address block (number of lines, number of words in the lines, number of symbols in the words).

In the above-identified prior art method, postal items recovered in sort outlet bins during a first sorting pass are recycled to the inlet of the sorting machine in order to perform the second sorting pass. Nevertheless, the operator must recycle items while maintaining both a relative order between bins, and a relative classification order of items within each bin. Unfortunately, the classification order of items can become disturbed between two such sorting passes, e.g. as a result of accidents or of shaking while full bins are being conveyed from the sorting outlet to the inlet of the sorting machine. It can also happen that some number of items become displaced in the feed magazine of the sorting machine due to an accident in the feeding thereof (e.g. jamming). Nor can it be excluded that doublets during the first sorting pass or the subsequent sorting passes end up disturbing the classification order of items between two passes.

The object of the invention is to propose another method of sorting postal items in a plurality of sorting passes on the basis of using digital fingerprints for the items, making it possible to ignore the classification order of postal items at the inlet to a sorting machine between two sorting passes so long as keeping the items in sequence is not a constraint of the sorting process itself.

To this end, the invention provides a method of sorting postal items in a plurality of sorting passes using at least one sorting machine having sorting outlets constituted by bins, each postal item having a surface carrying a destination address suitable for being recognized in the sorting machine by a data processor system for automatically recognizing addresses by OCR and/or by video coding, the method being characterized by the following steps:

during the first sorting pass, loading interchangeable empty bins into the sorting outlets of the machine, each bin carrying a bin identification number, and communicating the identification numbers of the empty bins to the data processor system; forming an image of the surface of each postal item as each item passes through the sorting machine, said image including the address information of the item, and deriving from said image a digital fingerprint which is an identifier of the postal item, and as said items are directed towards the sorting outlet bins, recording in the data processor system the digital fingerprints of the postal items in association with the identification numbers of the corresponding sorting outlet bins, and counting the postal items sent to each sorting outlet bin; and during the second sorting pass on the same sorting machine or on another sorting machine, loading the full sorting outlet bins into the sorting machine while informing the data processor system of the identification number of each loaded full bin, building up a database in the data processor system, the database comprising a collection of digital fingerprints as recorded during the first sorting pass in association with the sorting outlet bin identification numbers and corresponding to the identification numbers of the full bins that are loaded into the machine as postal items taken from the loaded full bins pass through the sorting machine, forming an image of the surface of each current postal item, which image includes the address information of the item, deriving an intermediate digital fingerprint from this image of the current postal item, assessing and scanning the database in order to detect a match between the intermediate digital fingerprint of the current postal item and a digital fingerprint in the database, and updating the database by counting the matches obtained for each loaded bin and the consecutive accesses to the database made without obtaining a match.

The method of the invention may present the following features:
  if a match is detected during the scan of the database, the corresponding digital fingerprint is marked in the database; and
  the bin identification numbers are picked up by reading a bar code applied to each bin.

An implementation of the method of the invention is described below in detail and shown in the drawings.

FIG. 1 is a diagram of a sorting machine for implementing the method of the invention.

FIG. 2 is a flow chart showing how the method of the invention runs during a first sorting pass.

FIG. 3 is a flow chart showing how the method of the invention runs during a second sorting pass.

FIG. 4 is a highly diagrammatic representation of an example of a database implemented in the method of the invention.

FIG. 5 shows how a digital fingerprint is built up for use in the method of the invention.

FIG. 6 also shows how a digital fingerprint is built up for use in the method of the invention.

The method of the invention for sorting postal items in a plurality of sorting passes is implemented in one or more sorting machines of the kind shown in FIG. 1.

The sorting machine 1 has a sorting zone 2 with a set of sorting outlets 3, in this case disposed in two superposed rows 3*a* and 3*b*. Each sorting outlet is constituted by an interchangeable receptacle or bin 4 into which the postal items directed to the corresponding sorting outlet are delivered. The bins 4 of the sorting outlets are interchangeable insofar as they are recycled to the inlet of the sorting machine. In order to implement the method of the invention, each bin 4 carries a bin identification number referred to below as Bin_ID, which ID number may be constituted, for example, by a bar code placed on a side of the bin so as to be read at any suitable moment by an automatic bar code reader.

As can be seen in FIG. 1, a bin transfer system 6 can be provided between the sorting outlets 3 and the feed magazine 5 of the sorting machine. The transfer system 6 may comprise conveyor belts or the like 8.

At the end of a sorting pass, the bins 4 filled with postal items can thus be disengaged from the sorting outlets of the machine and placed on the conveyor 8. The conveyor 8 is designed to operate in either direction so the full bins 4 can thus be recycled to the feed magazine 5 of the same sorting machine in order to perform a new sorting pass as represented by arrow Ec, or they can be delivered to an outlet as represented by arrow Ev for recycling into the feed magazine of another sorting machine.

Each postal item has a surface carrying destination address information, and as can be seen in FIG. 1, the sorting machine 1 includes a serialization and address reader device 9 for forming an image of the surface of each item (using a camera, not shown) that includes the address information of the item as the items are unstacked from the magazine 5 in well-known manner.

The device 9 is in communication with a data processor system 10 for automatically recognizing addresses by OCR and/or by video coding.

In order to implement the method of the invention, the ID numbers of full bins 4 loaded at the inlet of the sorting machine and empty bins 4 placed in the sorting outlet 3 of the sorting machine are always communicated to the system 10, e.g. by a bar code reader 11 shown very diagrammatically in FIG. 1.

Although shown very diagrammatically as a block in FIG. 1, the data processor system 10 is generally constituted by a set of computers connected in a network.

FIGS. 2 and 3 show how the method of the invention takes place.

During the first sorting pass, empty bins 4 are taken to the sorting outlet 3 of the sorting machine, and the ID numbers Bin_ID of the empty bins 4 are communicated to the system 10 by the reader 11 (step 30). The postal items for sorting are loaded into the magazine 5 of the machine in order to be serialized by the device 9.

As the items pass through the device 9, an image is made of the surface of each item that carries the destination address information of the item (step 31), and from this image a digital fingerprint V_ID is derived which constitutes an identifier for the item (step 32). The components of the digital fingerprint are described below.

In step 31, a temporary number referred to as Tag_ID below, of the ID-tag type can be generated and given to the item in order to perform automatic address recognition operations by OCR and video coding, in known manner.

In parallel with extracting the digital fingerprint V_ID, the address information is recognized, a sorting code is generated, and the postal item is sent to a sorting outlet corresponding to the sorting code, and at the outlet it is loaded into a corresponding bin 4 (step 33). As the postal items are loaded into the sorting outlet bins, the postal items loaded into each bin are counted. This counting is represented in FIG. 3 by a counter C1(Bin_ID). Below, the notation C1(Bin_ID) is used to designate the counter C1 associated with the bin having identification number Bin_ID. The notation C1(*) is used for designating all of the counters C1 associated with respective ones of the set of bins, and the notation C1(−) is used to designate all of the counters C1 associated with respective ones of the set of bins apart from the counter C1 associated with a particular bin designated by Bin_ID.

In the system 10, the digital fingerprint V_ID of the postal item is recorded in memory (step 34), and where appropriate the identification number Tag_ID of the item and the current value of the counter C1 associated with a bin number Bin_ID into which the corresponding items are sent. This information is recorded in the system 10 in a form that is structured so as to be recovered during the second sorting pass. For example, the system 10 may be designed to constitute one file per bin, which file records, amongst other things, the list of digital fingerprints and the identification numbers of the items loaded into the bin, together with the values from the counter C1.

When a bin reaches a certain filling level, or at the end of the first sorting pass, each full bin 4 is removed from the sorting outlet 3 to be recycled to the inlet of the same machine or of another machine, possibly situated on some other site.

FIG. 3 shows how the method of the invention runs during a second sorting pass or a subsequent sorting pass.

The full bins 4 taken from the sorting outlet 3 are thus directed, for example, to the feed magazine 5 of the machine. The Bin_ID number of each full bin is communicated to the system 10 (step 40) via the reader 11, and the items contained in the bin are loaded into the magazine 5 of the sorting machine. At this stage, there is no need for the operator to comply with a particular order for loading full bins into the inlet of the sorting machine. Similarly, the order in which the items are classified can be changed in the magazine of the machine.

On detecting insertion of a full bin identification number Bin_ID, the system 10 looks up in its memory the file corresponding to said bin in order to recover the list of digital fingerprints V_ID corresponding thereto, together with the count value C1(Bin_ID) corresponding to the number of items contained in the bin.

As full bins are inserted at the inlet of the sorting machine, the system 10 builds up a database DB by grouping together the list of digital fingerprints V_ID that have been recorded during the first sorting pass in association with the identification numbers of the sorting outlet bins and which correspond to the identification numbers of the full bins loaded into the machine.

If a full bin is loaded in the inlet of the sorting machine but does not come from a sorting outlet of the machine, for example a full bin coming from a local flow, then its identification number will not be recognized by the system 10 and it therefore will not be used for contributing to this sorting pass of the database DB.

FIG. 4 shows an example of the structure of the database DB in which the records contain the digital fingerprints V_ID1, V_ID2, V_ID3, etc. . . . in this case for three bins Bin_ID, Bin_ID', and Bin_ID". FIG. 4 also shows the counts C1 and C2 associated with these three bins for use during the process shown in FIG. 3. FIG. 4 also shows two records marked by the symbol F, with this marking also being used in the process shown in FIG. 3. As described below, the marking of a record by the flag F during the process shown in FIG. 3 serves to avoid the same item being recognized twice over in error.

Following step 40 of building up the database DB, the system 10 recovers the count values C1 associated with the full bins loaded into the sorting machine (step 41) and for each loaded bin it initializes (step 42) a count C2 for counting consecutive accesses to the database in a manner that is described below. In the blocks 41 and 42 in FIG. 3, there can be seen the counts C1 and C2 associated with the bin identified by its number Bin_ID, by using the notation C1(Bin_ID) and C2(Bin_ID).

In step 43, as the items are serialized, an image is formed of the surface of the current item that includes the address information in order to derive a temporary digital fingerprint V_ID from this image. A temporary number Tag_ID2 for the current item can also be generated by the system 10.

The system 10 accesses and scans the database DB to detect a match (step 44) between the temporary digital fingerprint V_ID of the current item and one of the digital fingerprints grouped together in the database DB.

In the event of a match with a fingerprint in the database, the system 10 verifies (step 45) that this fingerprint is not marked (symbol F in FIG. 4), and under such circumstances it updates the counts C1 and C2 associated with the bins (step 46) as described below, and marks the matching fingerprint in the database DB (with the symbol F in the present example). The system 10 can make use of the Tag_ID number recorded in association with the matching fingerprint to recover sorting information.

If the matching fingerprint has already been marked in step 45, then the system 10 updates the counts C2 associated with the bins (step 47) as described below.

If in step 44 no match is detected between the fingerprint of the current item and the fingerprints V_ID in the database DB, then the system 10 updates the counts C2 associated with the bins (step 48) and proceeds with automatic address recognition by OCR and/or by video coding to determine a sorting code corresponding to the destination address of the item. The sort information concerning this item may be recorded in the system 10 in association with the temporary number Tag_ID2.

In steps 46, 47, and 48, the counter C1(Bin_ID) associated with a particular bin counts the residual number of items for the bin still not identified while passing a current item, and the counter C2(Bin_ID) associated with a particular bin counts the number of consecutive accesses (scans) of the database DB that have occurred without an item of the bin being identified during the passage of the current item.

More particularly, in step 46, a match has been detected with an unmarked fingerprint in the database. The counter C2 of the bin corresponding to this fingerprint is initialized: C2(Bin_ID)=0. The counter C1 of the bin in question is decremented by unity: C1(Bin_ID)=C1(Bin_ID)−1. The counters C2 associated with the other bins in memory in the database DB are each incremented by unity: C2(−)=C2(−)+1. As mentioned above, the fingerprint in question in the database is marked (F).

In step 47, a match has been detected but with a fingerprint in the database DB that is already marked. The counters C1 and C2 associated with the bin corresponding to this fingerprint remain unchanged. However, the counters C2 associated with the other bins in memory in the database DB are each incremented by unity: C2(−)=C2(−)+1.

In step 48, no match has been detected. In which case, the counters C2 associated with all of the bins in memory in the database DB are incremented by unity: C2(*)=C2(*)+1.

Following mutually exclusive steps 46, 47, or 48, the system 10 compares the counts of the counters C1 and C2 associated with each bin (steps 49 and 50) with determined thresholds Nbatt and Nbmax. Nbatt is an adjustable threshold value equal to about 10 which corresponds to a certain waiting time before proceeding with a purge (step 51) of the database DB. Nbmax is a threshold value, of about 1000, which is adjustable and relates to the maximum number of items waiting in the feed magazine 5 of the sorting machine.

In step 49, if the current value of a counter C1 associated with a bin is zero: C1(*)=0, and if the value of the counter C2 associated with this bin is greater than Nbatt: C2(*)>Nbatt, then, in step 51, the database DB is purged of the fingerprints V_ID that are recorded in association with the bin in question. If there is a negative response on leaving step 49, then the count of counter C2 for each bin in memory in the database DB is compared with the threshold value Nbmax: C2(*)>Nbmax. If the count of the counter C2 of a bin is greater than Nbmax, then in step 51 the database DB is purged of the fingerprints V_ID which are recorded in association with the bin in question. This situation corresponds, for example, to all of the items loaded in the magazine of the machine having passed through without a match being detected for any of them.

After step 51, processing continues in step 43 for passing a new item, or to step 40 if a new full bin is loaded into the sorting machine.

Thus, as the bins are loaded into the sorting machine and the items therein pass through, the database DB is updated accordingly to restrict the match search horizon. The search horizon is at most about twice Nbmax when a full bin is loaded to the end of the magazine. The criterion for purging the database DB described above takes account of the situation in which the items of a bin are distributed between items that have already been loaded into the magazine of the sorting machine.

At the end of the second part or when a sorting outlet bin of the machine has reached a certain filling level, the system 10 records in a file associated with the sorting outlet bin the list of fingerprints V_ID of the items stored in said bin for which a match was detected in step 45, and the list of fingerprints V_ID of items stored in the bin that were not recognized in step 44. The data associated with the bin is ready for use in a new sorting pass which can be performed on the same machine or on another sorting machine. On the last sorting pass, the data is purged from the system 10.

The way in which a fingerprint V_ID of an item is built up is described below with reference to FIGS. 5 and 6.

FIG. 5 shows a gray image I of the surface of a postal item having a destination address block A. The digital fingerprint V_ID of the postal item that is derived from the digital image I comprises a first component PC, shown in FIG. 5, and a second component SC, shown in FIG. 6. These two components PC and SC of the fingerprint should in principle be independent of each other in order to obtain a fingerprint of highly discriminating character.

The first component PC is representative of a physical characteristic of the digital image I, and is, for example, extracted by statistical analysis of the luminance of points of the digital image I that has previously been subjected to a succession of filter operations for reducing the level of resolution of the image in order to reduce processing time for the statistical analysis and in order to have content of low-frequency type which is relatively insensitive to fluctuations in luminance between multiple different acquisitions. The luminance of a point of the image corresponds to the value of the gray level of that point of the image. Starting from a low resolution digital image I of the surface of a postal item, global attributes such as height and width of the postal item, maximum, minimum, and mean luminance values for the points of the digital image, standard deviation, energy, entropy, of the luminance values can be extracted by calculation. Local attributes relating to distinct portions of the digital image can also be extracted by calculation. FIG. 5 shows the digital image I subdivided into a plurality of distinct portions B11, B'45 derived using different grid patterns M1, M2, M3, M4, and M5 on the digital image I. The grid M1 in this case defines 3 by 3 distinct portions. The grid M5 defines 8 by 10 distinct portions. The number of distinct portions in a grid and the number of grids can be parameters of the statistical analysis applied to the digital image in order to extract the first component PC of the digital fingerprint. Starting from each portion such as B11 and B'45 of the digital image that results from a grid such as M1 or M3, it is possible to extract local attributes such as the maximum, minimum, and mean luminance values of the points of said portion of the digital image, or the standard deviation, energy, and entropy of the luminance values in this portion of the digital image. These local attributes contain information that is more discriminating when postal items are non-uniform. It is also possible to extract from this portion of the digital image a histogram that is representative of the distribution of luminance values. A plurality of histograms can be extracted for distinct portions of the digital image I representing discriminating texture information that is relatively insensitive to small variations in the digital images made of the same postal item as it passes through successive sorting operations.

Together the global and local attributes extracted from a digital image constitute the first component PC of the fingerprint V_ID of a postal item.

In FIG. 6, the second component SC of the digital fingerprint is extracted from the digital image I by the device 9 for recognizing addresses by OCR. A system for recognizing addresses by OCR is capable of supplying data giving the positions of blocks of text information as detected in the digital image, such as the block A containing the address information. This data indicative of position can be the position and orientation coordinates of the rectangular zone forming the address block A. A system 9 for OCR recognition is also suitable for supplying a textual description of each information block detected in the digital image, in particular in the address block A. A textual description of an information block such as A can consist in being the number of lines of characters detected in the information block, the number of words detected in each line of characters, and the numbers of characters detected in each word of each line of characters.

FIG. 6 shows an example of a textual description of an address information block constituting the second component SC of the fingerprint of a postal item.

In FIG. 6:

"Block#0/3", referenced 70, is the reference for information block number 0 amongst three information blocks detected in the digital image I;

"HN", given reference 70', is data indicative of the orientation of the information block 0 in the digital image;

"(0684 0626 0895 0745)", given reference 70", is data giving the position coordinates of information block 0 in the digital image;

"No. Lines 4", given reference 70''', states that the information block 0 has four lines of characters;

"Line #0", referenced 71, refers to the first line of characters detected in information block 0;

"No. Words 03", referenced 72, is data indicating that three words have been detected in the first line of characters;

"No. Char.PerWord 01 06 04" referenced 73, is data indicating that the three words in the first line of characters comprise respectively 1, 6, and 4 characters;

"Char. #0 (1 007 I 009 i 019)", referenced 74, is data indicating that for the first character of the first line of characters, OCR has identified three candidate characters that are respectively 1, I, and i with likelihood distances respectively of 007, 009, and 019;

"Char. #1 (L 008 E 009 D 057)", referenced 75, is data indicating that for the second character of the first line of characters, OCR has identified three candidate characters that are respectively L, E, and D, with likelihood distances respectively of 008, 009, and 057;

and so on for the other characters of the first line of characters, it being understood that a value of 0 for a likelihood distance is the shortest distance, i.e. representing the smallest difference compared with an ideal character.

In step 44 in FIG. 3, scanning the database DB consists in comparing the components PC and SC of the intermediate fingerprint of the current item with the components PC and SC of the fingerprints stored in the database DB.

Comparing the components PC of the fingerprints when a component PC is made up of global and local attributes as stated above can begin by comparing the respective global attributes which include thresholding of absolute values of variations over each global attribute in order to perform a first filtering operation amongst the fingerprints recorded in the database. This filtering serves to eliminate fingerprints that are very dissimilar from the fingerprint of the current item, thereby retaining only a small number of candidate fingerprints. Thereafter, local attributes of the component PC of the fingerprint of the current item can be compared with respective candidate fingerprints so as to reduce the number of candidate fingerprints. This comparison can be based initially on calculating a standardized sliding correlation coefficient between the corresponding histograms in the fingerprint of the current item and the respective candidate fingerprints, thus making it possible to ignore variations in luminance when taking the images of the surfaces of the items, and subsequently by calculating a standardized correlation coefficient per attribute type between the other local attributes of the fingerprint of the current item and in the respective candidate fingerprints, thereby making it possible to overcome problems associated with normalization due to the variability difference of each local attribute. Thereafter the candidate fingerprints are sorted in order of decreasing similarity on the basis of correlation coefficients and a fixed number of the most similar candidate fingerprints are retained.

Comparison between the components SC of the fingerprints can begin by measuring the similarity of data giving the positions of information blocks in order to pre-select candidate fingerprints. Thereafter the candidate fingerprints can be sorted in decreasing order on the basis of measured similarity between the textual descriptions of the information blocks.

Comparison of the components PC can be preferred compared with comparison of the components SC, or vice versa, depending on the type of postal item being processed. For a batch of letters having a large quantity of handwritten letters, comparing the components PC of the handwriting is preferred when searching for a fingerprint in the database DB. In contrast, with batches of bulk mail, it can be better to compare the components SC of the fingerprints.

In the method of the invention, it is possible to apply a label or print directly the Tag_ID number on each item on the surface of the item so as to make use of existing solutions in order to proceed with automatic address recognition by OCR and/or by video coding.

The invention claimed is:

1. A method of sorting postal items in a plurality of sorting passes using at least one sorting machine (1) having sorting outlets (3) constituted by bins (4), each postal item having a surface carrying a destination address (A) suitable for being recognized in the sorting machine by a data processor system (10) for automatically recognizing addresses by OCR and/or video coding, the method being characterized by the following steps:

during the first sorting pass, loading interchangeable empty bins into the sorting outlets of the machine, each bin carrying a bin identification number (Bin_ID), and communicating (30) the identification numbers of the empty bins to the data processor system; forming (31) an image of the surface of each postal item as each item passes through the sorting machine, said image including the address information of the item, and deriving (32) from said image a digital fingerprint (V_ID) which is an identifier of the postal item, and as said items are directed towards the sorting outlet bins, recording (33, 34) in the data processor system the digital fingerprints of the postal items in association with the identification numbers of the corresponding sorting outlet bins, and counting the postal items sent to each sorting outlet bin; and during the second sorting pass on the same sorting machine or on another sorting machine, loading the full sorting outlet bins into the sorting machine while informing (40) the data processor system of the identification number of each loaded full bin, building up a database (DB) in the data processor system, the database comprising a collection of digital fingerprints as recorded during the first sorting pass in association with the sorting outlet bin identification numbers and corresponding to the identification numbers of the full bins that are loaded into the machine as postal items taken from the loaded full bins pass through the sorting machine, forming (43) an image of the surface of each current postal item, which image includes the address information of the item, deriving an intermediate digital fingerprint from this image of the current postal item, assessing and scanning (44) the database in order to detect a match between the intermediate digital fingerprint of the current postal item and a digital fingerprint in the database, and updating (51) the database by counting (46, 47, 48) the matches obtained for each loaded bin and the consecutive accesses to the database made without obtaining a match.

2. The method of claim 1, in which if a match is detected during the scan of the database, the corresponding digital fingerprint is marked in the database.

3. The method of claim 1, in which the bin identification numbers are picked up by reading a bar code applied to each bin.

4. The method of claim 1, in which a two-component digital fingerprint (V_ID) is deduced from the digital image of the surface of an item, a first component (PC) being representative of a digital characteristic of the physical image, and a second component (SC) being extracted by optical character recognition (OCR) in the digital image.

5. The method of claim 4, in which the first component (PC) of the digital fingerprint is extracted by statistical analysis of the luminance of points of the digital image.

6. The method of claim 4, in which the first component (PC) of the digital fingerprint is constituted by data representative of variation of the luminance values in the digital image.

7. The method of claim 4, in which the first component (PC) of the digital fingerprint is constituted by data representative of variation of the luminance values in distinct portions of the digital image.

8. The method of claim 4, in which the first component (PC) of the signature is constituted by histograms representative of the distribution of luminance values in distinct portions of the digital image.

9. The method of claim 7, in which the distinct portions of the digital image are derived from different grids (M1, M2, M3) in the digital image.

10. The method of claim 4, in which the second component (SC) of the digital fingerprint is constituted by data specifying the position of at least one information block in the digital image.

11. The method of claim 1, in which the second component (SC) of the digital fingerprint is constituted by a textual description of at least one information block in the digital image.

12. A postal item sorting machine arranged to execute the method according claim 1.

* * * * *